United States Patent [19]

Hampshire

[11] 4,290,134
[45] Sep. 15, 1981

[54] MULTIPLEX INFORMATION HANDLING SYSTEM

[75] Inventor: Michael J. Hampshire, Liversedge, England

[73] Assignee: Ward & Goldstone Limited, Salford, England

[21] Appl. No.: 17,096

[22] Filed: Mar. 5, 1979

[30] Foreign Application Priority Data

Mar. 10, 1978 [GB] United Kingdom ............... 9493/78

[51] Int. Cl.³ ........................... H04J 6/00; H04J 3/08
[52] U.S. Cl. ............................ 370/92; 340/870.12; 370/85
[58] Field of Search ......... 179/15 BA, 15 AL, 15 BS, 179/15 R; 340/147 LP, 147 SY, 157, 183; 370/92, 93, 85, 89

[56] References Cited

U.S. PATENT DOCUMENTS

| | | | |
|---|---|---|---|
| 3,814,861 | 6/1974 | Robbins | 370/92 |
| 3,846,587 | 11/1974 | Schenkel et al. | 179/15 BA |
| 3,947,811 | 3/1976 | Hodgson | 340/183 |
| 4,052,567 | 10/1977 | MacKay | 179/15 AL |
| 4,053,714 | 10/1977 | Long | 179/15 AL |
| 4,063,220 | 12/1977 | Metcalfe et al. | 370/93 |
| 4,139,737 | 2/1979 | Shimada et al. | 370/92 |
| 4,156,112 | 5/1979 | Moreland | 179/15 AL |
| 4,199,663 | 4/1980 | Herzog | 370/92 |

FOREIGN PATENT DOCUMENTS

| | | |
|---|---|---|
| 1252632 | 11/1971 | United Kingdom . |
| 1344619 | 1/1974 | United Kingdom . |
| 1427133 | 3/1976 | United Kingdom . |
| 1482774 | 8/1977 | United Kingdom . |
| 1494240 | 12/1977 | United Kingdom . |

*Primary Examiner*—Douglas W. Olms
*Attorney, Agent, or Firm*—Fleit & Jacobson

[57] ABSTRACT

A multiplex information handling system comprises a series of electronic processing units each comprising a receiver and a transmitter and each having an electronic address in binary form. The units are joined by a coaxial cable which in operation carries power along the cable sheath and information signals in binary form along the central core. Each unit controls the operational state of various items of equipment, for example of a vehicle, and receives and transmits signals controlling and representing those states. All units receive all transmitted signals, the correct signal being directed to the correct item of equipment by producing the correct unit address at the head of each information signal. The transmitters transmit repeatedly and sequentially, all transmitters being inhibited from transmitting except the transmitter transmitting at the time. The information concerning the operational states of the various items of equipment is therefor continually updated.

26 Claims, 12 Drawing Figures

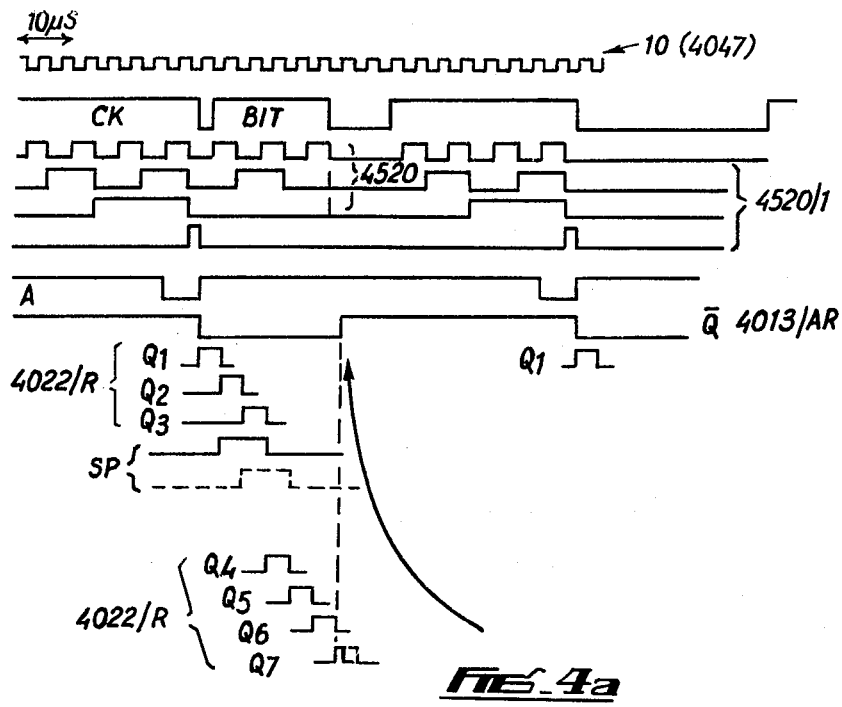
FIG. 4a
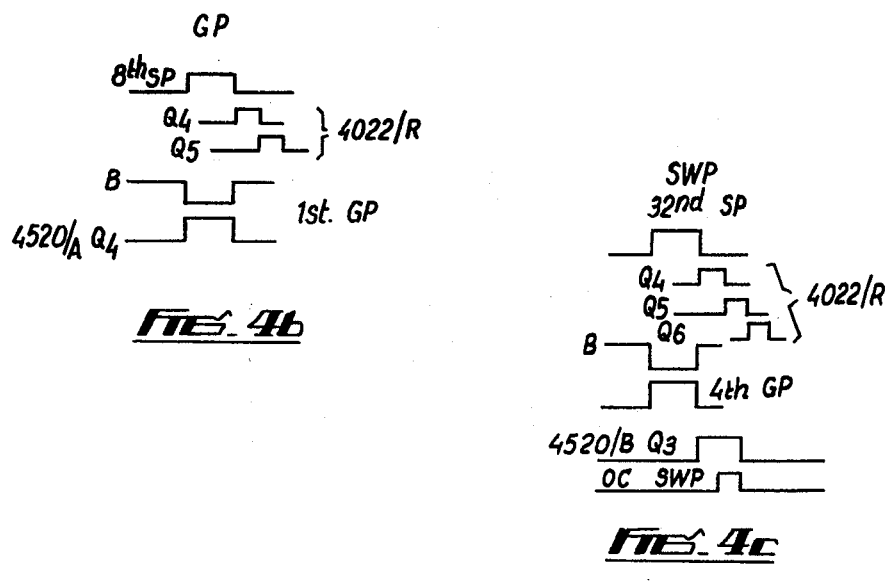
FIG. 4b
FIG. 4c

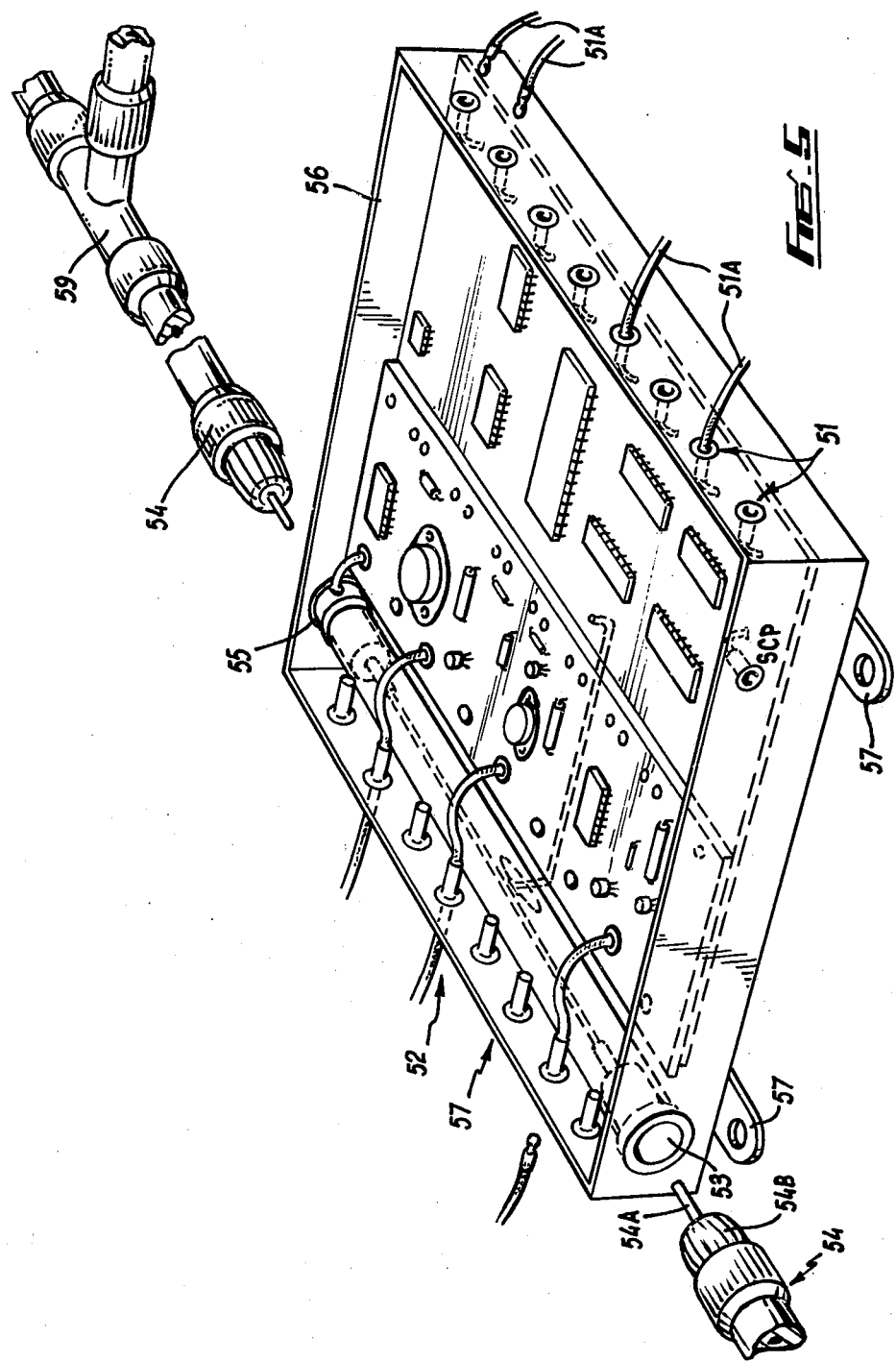

MULTIPLEX INFORMATION HANDLING SYSTEM

The present invention relates to an information handling system.

The system is particularly applicable to vehicles. In present day vehicles the electrical equipment is usually controlled through a wiring harness. As the electrical equipment of vehicles has increased, so also has the complexity of the corresponding wiring harness. This has led to difficulties in installation, increased expense, and, where faults have occurred difficulties in locating which part of the harness the fault is located in and which part therefore required replacement. Even where faults are quite quickly located, the actual repair involving the replacement or repair of a part of the wiring harness or in extreme cases the replacement of the whole harness is an expensive and time consuming operation often involving the use of skilled labour or complex fault diagnostic equipment.

Attempts have been made to overcome the disadvantages of such systems using semiconductor based hardware with a central monitor or microprocessor controlling each of a plurality of local stations controlling predetermined items of the vehicle electrical equipment. The disadvantages of such an arrangement are that the microprocessor is at the present time quite expensive, certainly the most expensive part of the overall system, and should a fault occur in it it is correspondingly difficult to put right. Not only that, since all the local stations are subservient to the microprocessor, should a fault occur the vehicle often suffers a complete electrical shutdown for it is usually not then possible for the local stations to be interrogated and/or instructed concerning their status and the status of the individual items of electrical equipment controlled by them.

According to the present invention, there is provided a multiplex information handling system comprising a plurality of local processing units interconnected by a signal bus and power bus each unit comprising means for receiving signals and means for transmitting signals along the signal bus whereby information concerning the operational state of one or more pieces of control equipment may be fed to each of the local processing units via the signal bus and information concerning the operational state of pieces of equipment adapted to be controlled by the pieces of control equipment may also be fed to each of the local processing units.

In order that the invention may be more clearly understood, one embodiment of the invention will now be described, by way of example, with reference to the accompanying drawings, in which:

FIGS. 3, 3a and 3b are diagrams showing timing for the transmitter of FIG. 1,

FIGS. 4, 4a through 4c are diagrams showing timing for the receiver of FIG. 2,

FIG. 5 is a diagrammatic perspective view of a local processing unit for an information handling system, FIG. 6 is a sample transmitted word from the transmitter of one of the local processing units of FIG. 1, and FIG. 7 diagrammatically illustrates a fault identification and display arrangement for an information handling system for a vehicle.

Figure 1:
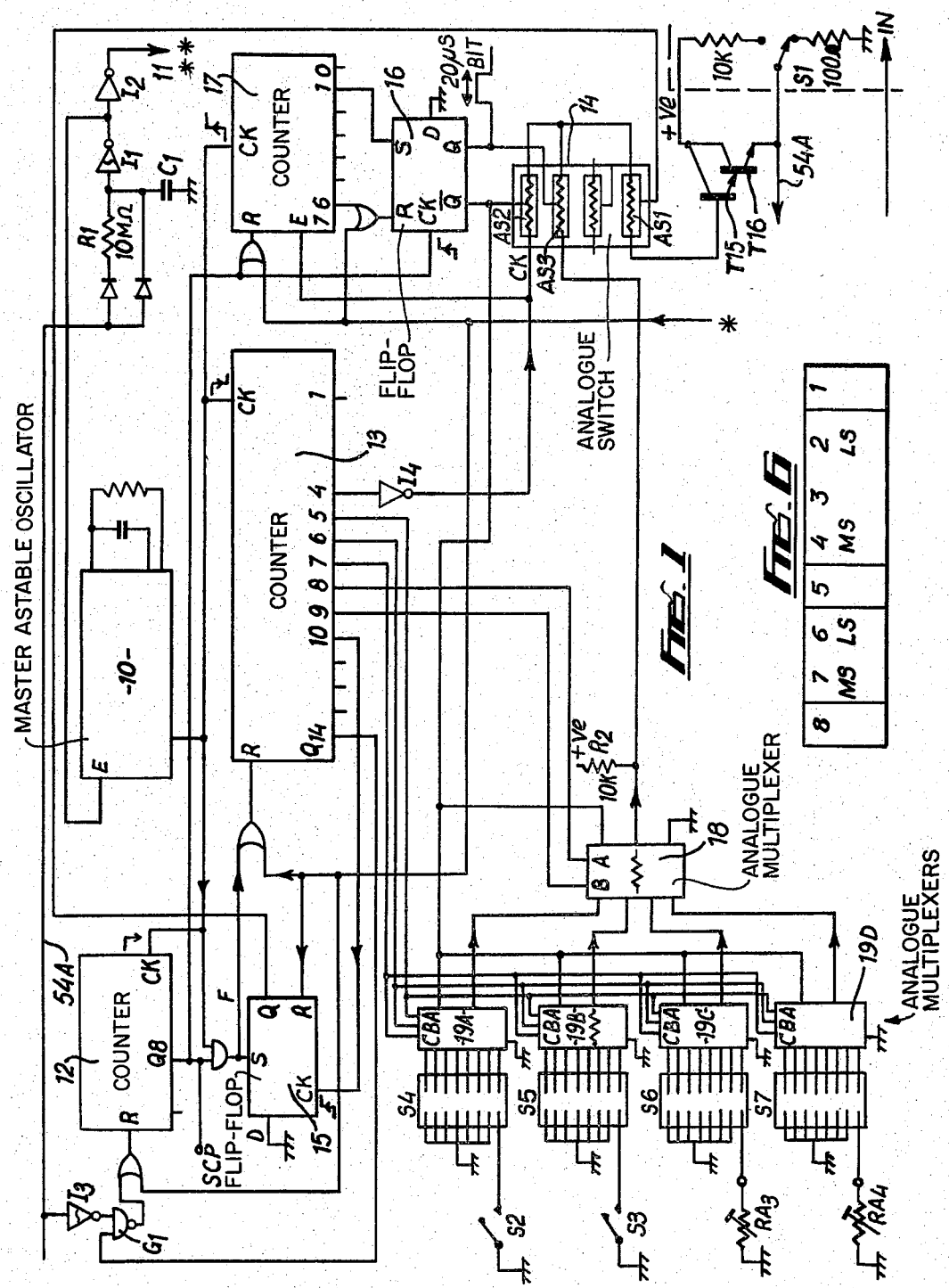
FIG. 1 is a block circuit diagram of a transmitter of a local processing unit of an information handling system for a vehicle.

In the drawings pulse type designations are as follows: gate pulse GP, switch pulse SWP, sync. pulse SCP, and sample pulse SP.

The information handling system comprises a plurality of local processing units of the type shown in FIG. 5 (lid removed). Each of these units has a plurality of inputs 51, a plurality of outputs 52, an input socket 53 for a combined signal and power bus 54 and an output socket 55 for the bus 54. The inputs 51, including inputs 51A from switches and analogue sensors, lead to and the outputs 52 lead from circuitry contained in a housing 56 having apertured lugs 57 for connecting it to a convenient support.

In this arrangement eight local processing units (l.p.u.) are provided connected in series. Each unit has four inputs and four outputs giving a total of thirty two inputs and thirty two outputs. More inputs and outputs can be provided (as indeed can more units) but each unit's circuitry will have to be increased over that to be described in order to handle the additional inputs and outputs. By connecting the local processing units in series any signal present on the signal bus is received by all local processing units. No central processing unit is therefor required decreeing which of a number of subsidiary local processing units should receive which information. Because the signal bus carries all signals to and from all units some signals identification system is required so that any input can recognise a signal intended for it. Additionally, the system is designed so that only one local processing unit can transmit at any one time.

The system is intended for a vehicle in particular the relatively small mass produced family saloon. It will replace the present conventional wiring harness which is becoming increasingly complex, difficult to install and expensive. The combined signal and power bus can be taken simply round the vehicle in a similar fashion to a ring main and local processing unit arranged on it at appropriate positions. The combination of signal and power lines in a signal bus has other advantages. The bus comprises concentrically arranged inner and outer conductors 54A and 54B. The outer conductor, which constitutes the power line, contains a substantial amount of copper which ensures good screening for the inner conductor which constitutes the signal line. This screening effect will minimise the tendency to pick-up voltage spikes on the signal bus from electrical equipment in the vehicle. Also, the screening effect will minimise the interference caused to radio reception in the vehicle from pulses present on the signal bus. Further, the co-axial arrangement is convenient for a moulded plug, and socket connection to each l.p.u., where the large area provided by the outer contact will carry the high current.

The input and output sockets 53 and 55 of each l.p.u. are coaxially arranged. Co-axial "Tee" junctions can be provided as shown in FIG. 5 at 59 to give total flexibility to the wiring of the bus which may form loops or rings with spurs if required. This will enable the current requirement to different loads to be balanced, such that very substantial current capacity of the co-axial outer conductor 54B is avoided. The co-axial cable need not be flexible and the expensive use of braids is not required. The local processing units are spaced along the combined power and signal bus at suitable intervals determined by the load and switch requirements of the vehicle in which the system is installed.

The circuitry of each local processing unit comprises a receiver and a transmitter. Each transmitter functions to transmit information in digital form representative of the operational state of the various controls and loads connected to the corresponding local processing unit. Each receiver functions to receive the transmissions from the transmitters of the local processing units appropriate to the inputs of the corresponding unit. In order to convey data from one point of the vehicle to another in this case a word containing eight bits respectively numbered 1 to 8 is transmitted. The organisation of the word is shown in FIG. 6. Three bits respectively numbered 2, 3 and 4 identify which of the eight units will receive the transmitted word, and bits 6 and 7 will identify which of four output addresses in a given unit will receive the data.

Two bits of the word (5 and 1) are used as parity checks on the unit number and output address number.

The last bit to be transmitted, bit 8, contains the data. A zero is transmitted to indicate that a load should be on and a "one" is transmitted to indicate that a load should be off. For analogue data, the height of the eighth bit pulse is proportional to the magnitude of the quantity transmitted, such as for example the amount of petrol in the petrol tank.

Each box transmits all the four times eight bits appropriate to its four inputs in 2 ms, and then does not transmit again for 32 ms. During this delay other transmitters in other boxes are sending data. After 32 ms delay a transmitter again interrogates the signal bus, and, if this is found to be low for a period exceeding 0.5 ms, transmission again begins. In this way all transmitters have ample opportunity to transmit. Every datum appropriate to an input is transmitted every 32 ms or 30 times each second.

The state of the output only changes if an input switch has been operated. For a successful system it is only necessary to send each datum at a rate in excess of 4 times each second. There is plenty of scope for expanding the system by increasing the length of each word and hence increasing the number of units and output addresses.

The circuits shown, use standard CMOS integrated circuits, but the ultimate intention is that the entire circuit should be integrated into one or more integrated circuits. The system is designed to facilitate the move to that stage. The pins of the various integrated circuits on the figures of the drawings are referenced as follows set S, reset R, (or clear CR), clock CK, enable E.

Each local processing unit operates in the following manner. Referring to FIG. 1, the control of the timing is derived from a master astable oscillator 10 (4047) producing 2 µs pulses. Each transmitter/receiver of each local processing unit will have its own oscillator, and the system does not require that the oscillators be synchronised nor need they be accurately of the same frequency as considerable variation could be tolerated.

Figure 2:
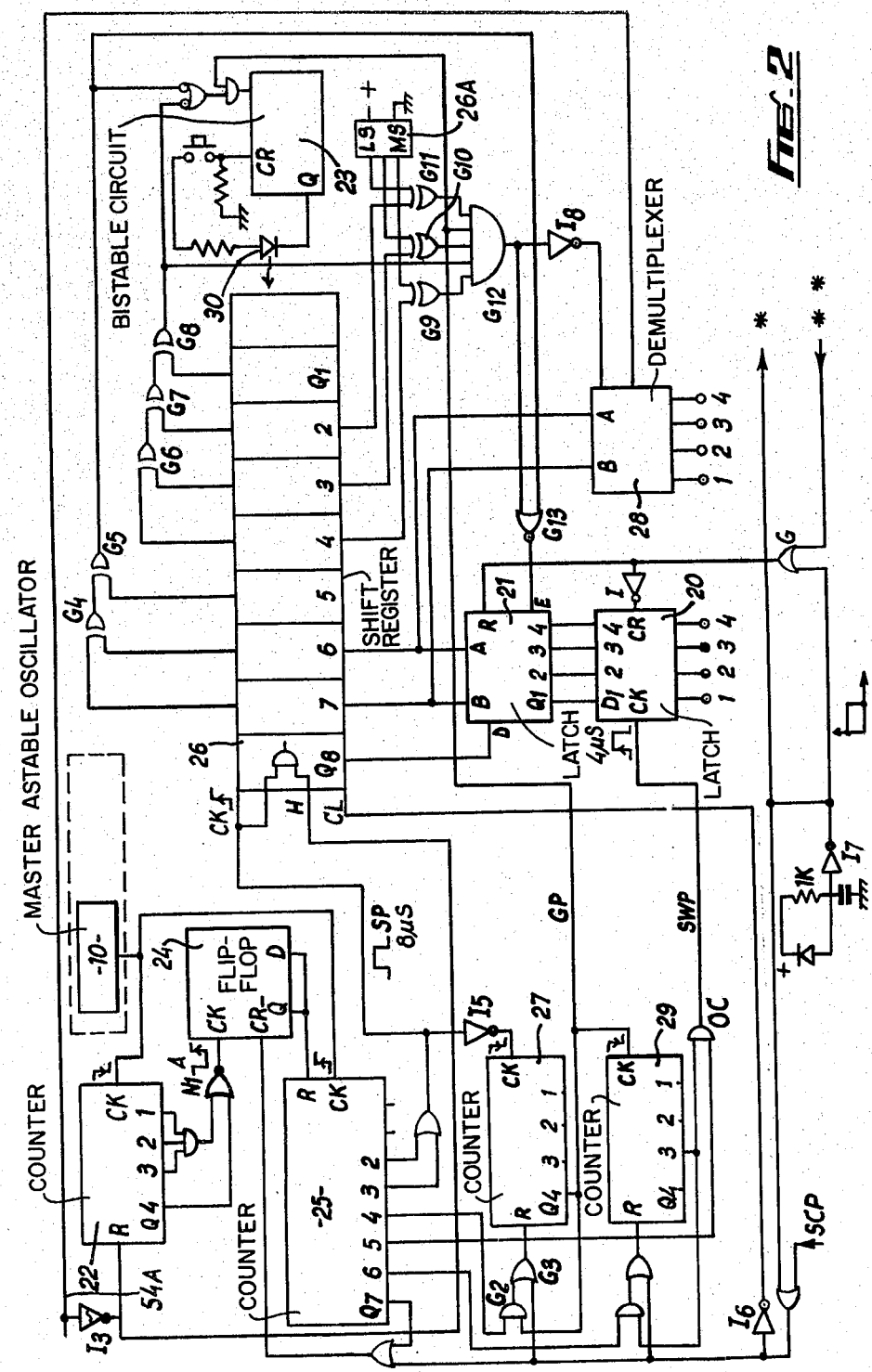
FIG. 2 is a block circuit diagram of a receiver of a local processing unit of an information handling system for a vehicle.

The system is running all the time in that a given unit transmits all its data four times eight bit words in a data block and then does not transmit again for some time. During this delay other units are transmitting, and all units are receiving every transmission. To stop the system a switch S1 connects the signal bus 54A via a 10 KΩ resistor to the positive rail (see FIG. 1). As the transmitter is asynchronous and transmits only when the signal bus 54A has been continuously low for a given period, connecting the bus 54A to a high, prohibits all transmission. Switch S1, which constitutes a master stop/go control for the whole system, can be housed in a separate unit, which may have security devices fitted. Alternatively, the switch may be combined with a lock or other security device. If the system is stopped, the signal bus 54A is high and a capacitor C1 is charged via 10 MΩ resistor R1 in a time of 0.5 µs. Capacitor C1 is connected to the input of NOT gate I1 (Schmitt Inverter) the output of which goes low when C1 is charged thus disabling the astable oscillator 10 (4047) which then stops. As all circuits are CMOS they will all be frozen in their last state. The output of NOT gate I1 is fed to the input of a further NOT gate I2 whose output 11 is connected to an OR gate G (see FIG. 2). The symbols ** and * indicate points of connection of the transmitter (FIG. 1) to the receiver (FIG. 2). The output from gate G is fed through a NOT gate I to the clear terminal of a latch 20 (74C175) and the reset terminal of a latch 21 (4723/A) forming part of the receiver circuitry of the unit. Thus a signal from gate I2 clears the latches 20 (74C175) and 21 (4723/A) and hence all outputs go to the off-state. The system then draws no current from the supply.

Figure 7:
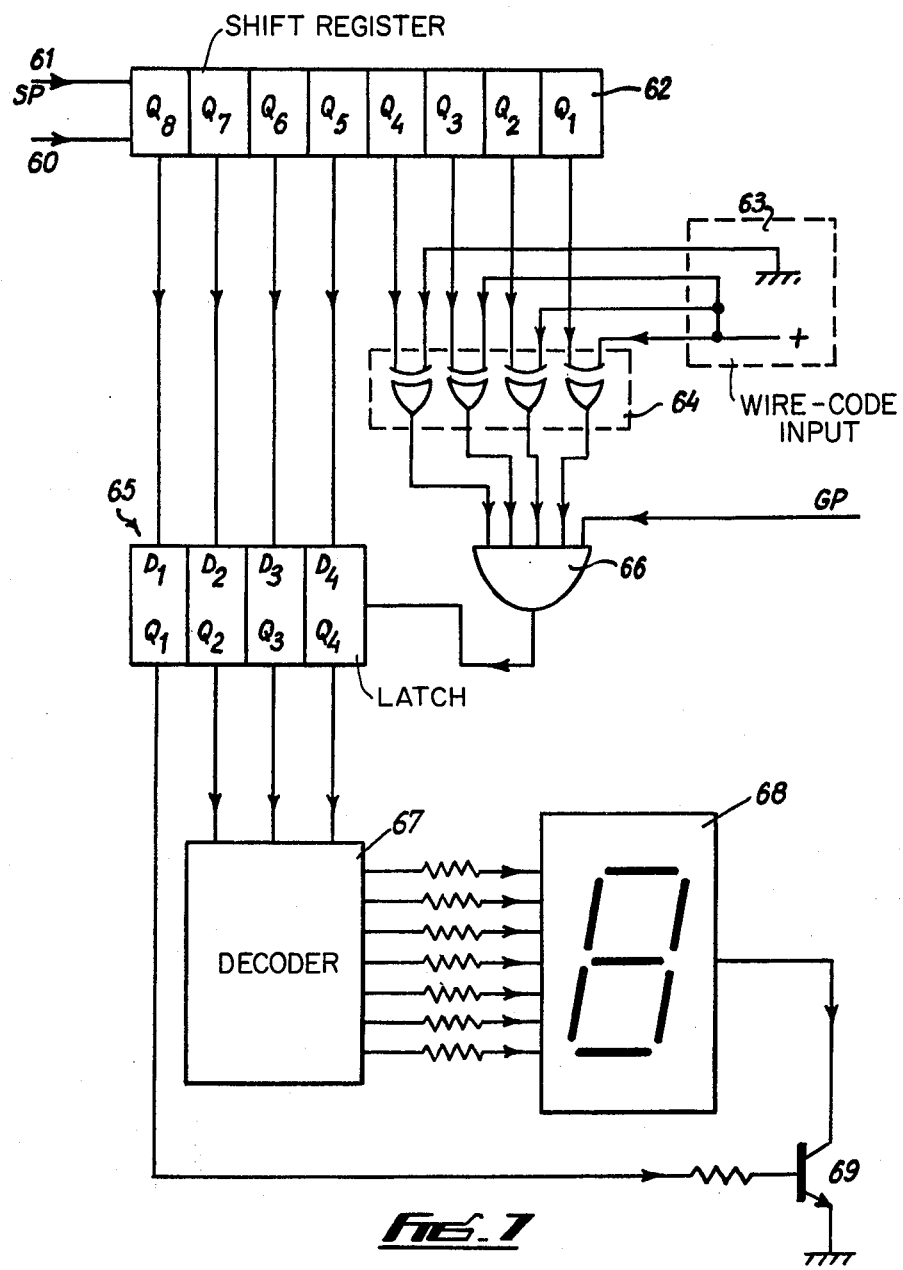

When power is first applied to the system a high level from gate I7 exists from 100 µs to clear all functions. At the start of transmission a sync. pulse is produced at one output Q8 of a counter 12 (4040) (FIG. 1). This sync. pulse clears many counters and bistables in both the transmitter (FIG. 2) and receiver (FIG. 1). Clearing certain circuits in the receiver is essential to avoid a single counting error existing indefinitely. By clearing the receiver once in each cycle of transmission a counting error occurring in reception will produce only one error for any given load. Some circuits are not cleared by the sync. pulse, such as the output latches 21 (4723/A) and 20 (74C175), counters 12 (4040) and 22 (4520/11 (FIG. 7) and bistable circuit 23 (4013/BR), as it is necessary that these are cleared in other ways.

Referring again to FIG. 1, the transmitter comprises a fourteen stage counter 13 (4020) fed with 2 µs pulses from the oscillator 10 (4047). After 32 ms output Q14 rises enabling the state of the signal bus 54A to be interrogated via a NOT gate I3. If the signal bus 54A is low (i.e. quiet) then the reset (clear) of counter 12 (4040) goes low and its starts counting oscillator pulses. After 0.5 ms output Q8 of counter 12 (4040) rises, if the signal bus 54A has been quiet for the full 0.5 ms. This can only occur if no other unit is transmitting. As output Q8 rises the leading edge of the sync. pulse clears many functions. The next oscillator pulse is gated with Q8 to produce a "high" on line F which sets the circuit 15 (4013/AT) and clears counter 13 (4020). When the counter 13 (4020) is cleared the falling signal on output Q14 clears counter 12 (4040) via NAND gate G1 and produces the falling edge of the signal on line F and sync. pulse. This timing is shown in FIG. 3a (START OF TRANSMISSION). When circuit 15 (4013/AT) is set, output Q rises and enables an analogue switch AS1 of circuit 14 (4066) which permits transmission of data onto the signal bus 54A via a pair of NPN transistors T15 and T16 (BC184L and BF741). Output Q from circuit 15 (4013/AT) remains high for 2 ms in which time all four times eight bit words together with 32 µs clock pulse preceding each bit have been transmitted. Output Q10 of counter 13 (4020) rises and transfers the zero at input D to output Q in circuit 15 (4013/AT) hence clearing the bistable which in turn disables transmission by opening analogue switch AS1 in analogue switch circuit 14 (4066).

Figure 3:
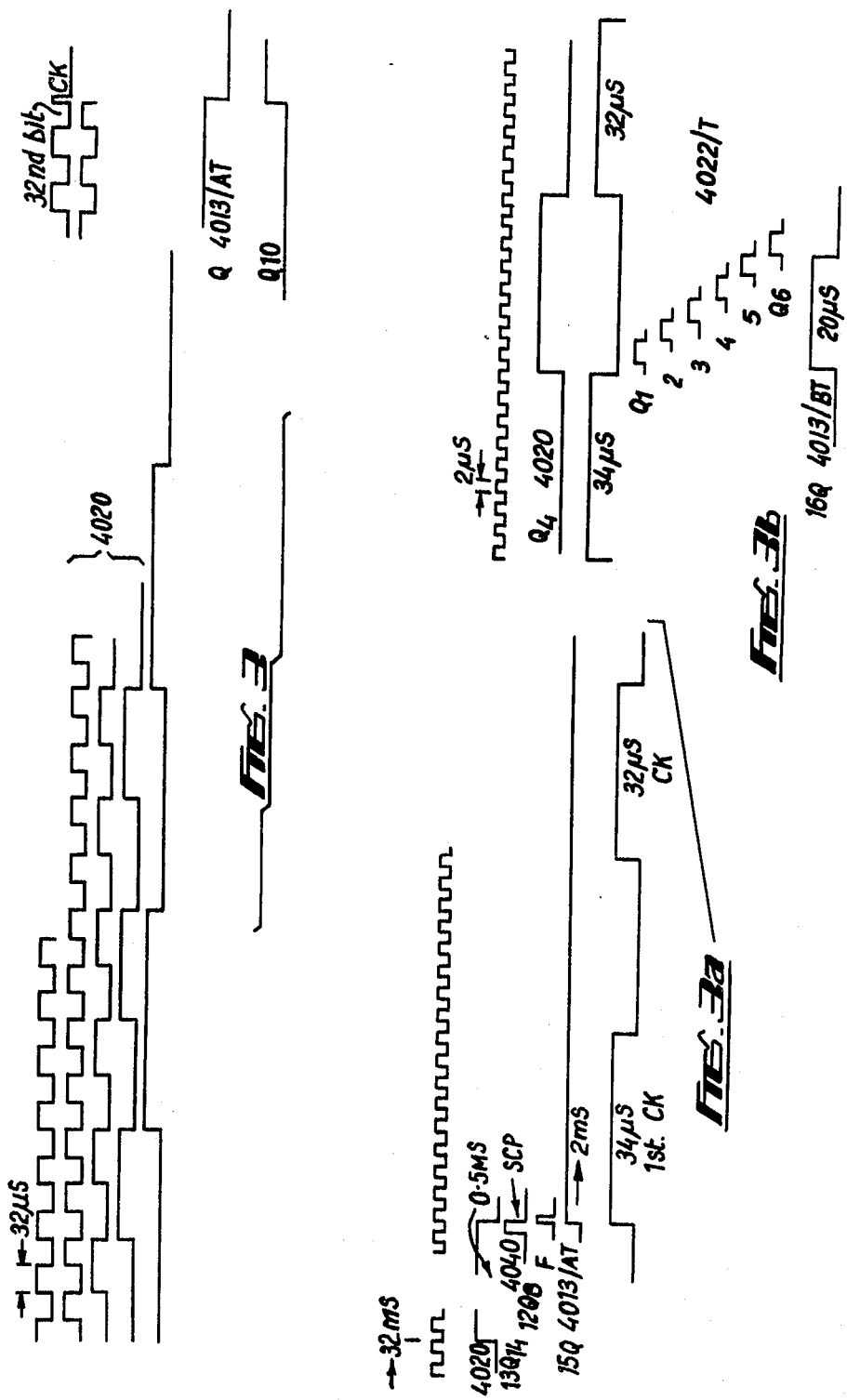

The 32 μs clock pulses are provided by inverting output Q4 of counter 13 (4020). The pulses are transmitted via AS2 and AS1 of switch 14 (4066). The individual bits in each word are 20 μs long and are placed between 32 μs clock pulses. The timing of the bits is produced at the Q output of circuit 16 (4013/BT) (FIG. 3b) which is set by output Q1 of circuit 17 (4022/T) which is a decoded eight stage counter. Circuit 16 (4013/BT) is cleared by output Q6 from counter 17 (4022/T) and hence output Q of circuit 16 (4013/BT) rises for 20 μs. Counter 17 (4022/T) is only enabled to count during a low in the clock signal and the 20 μs bit slot is therefore positioned between clock pulses and displaced by 2 μs from the falling clock edge. This timing is shown in FIG. 3 and in FIG. 4.

The clock signal at NOT gate I4 is transmitted to the signal bus 54A via switch AS2 enabled by output Q of circuit 16 (4013/BT) except when the 20 μs bit slot is generated at output Q from circuit 16 (4013/BT) and switch AS3 is opened to transmit the appropriate bits when switch AS2 is closed.

In this embodiment the bits are generated by four eight-way switches S4, S5, S6, S7 and the eight data bit is under the control of further switches S2 and S3 which are inputs to the system. When closed, a zero is generated and when open the 10 KΩ pull up resistor R2 at the output of four to one analogue multiplexer 18 (4052/A) produces a "one". Variable resistors RA3 and RA4 hold analogue data and the pulse height transmitted depends on the ratio of the value of the variable resistor to 10 KΩ.

The bits are scanned in turn by four, eight to one analogue multiplexers 19A to D (4051) which are followed by the four to one multiplexer 18 (4052A). The addresses for multiplexing are derived directly from outputs Q5 to Q9 of the counter 13 (4020) as shown in FIG. 3. The multiplexers 12 and 19A to D are inhibited by the $\overline{Q}$ output of the circuit 16 (4013/BT), or in other words, bits are multiplexed onto the bus only when output Q of circuit 16 (4013/BT) rises for 20 μs defining the bit time slot (FIG. 3b).

The receiver operates to discriminate between clock pulses of 32 μs duration and bit pulses of 20 μs duration. Having obtained a clock pulse, the receiver generates an 8 μs sample pulse falling within the 20 μs bit time slot, the timing to be synchronised from the falling edge of each clock pulse. In this way every receiver is synchronised to the transmitters clock. As the basic timing for a given receiver is obtained from the oscillator within the given transmitter/receiver unit, and this is not synchronised with the transmitter oscillator, the sample pulse SP and other pulses derived from it are not uniquely positioned in time with relation to the bit time slot but fall between two positions; one shown solid and one dotted in FIG. 4.

When the signal bus 54A is high gate I3 output goes low and counter 22 (4520/1) starts to count 2 μs oscillator pulses. If the pulse on the signal bus 54A exceeds 28 μs in duration then outputs Q1, Q2 and Q3 of counter 22 (4520/1) go high and a low at A is produced at the clock input of circuit 24 (4013/AR). A is maintained low by output Q4 via NOR gate N1 until the pulse ends and counter 22 (4520/1) is reset and A rises changing the state of circuit 24 (4013/AR). If a pulse less than 28 μs is present in the signal bus 54A, no negative pulse at A is produced and in this way 32 μs clock pulses and 20 μs bit pulses are discriminated one from the other.

Figure 4:
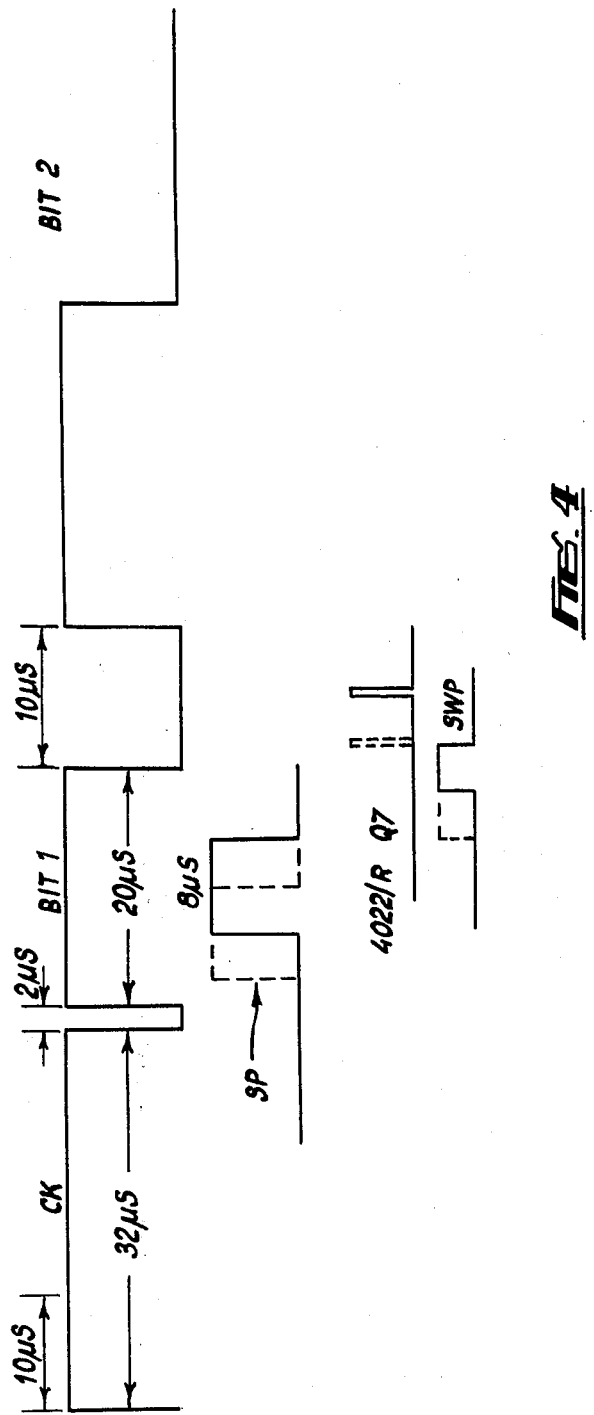

The output $\overline{Q}$ of circuit 24 (4013/AR) falls at a falling clock edge and permits counter 25 (4022/R) to count. Gating outputs Q2 and Q3 generate an 8 μs sample pulse falling within the 20 μs bit time slot as shown in FIG. 4. The sample pulse is applied to the clock input of shift register 26 (74C164) and the inverse of the bit present on the signal bus 54A is placed in the shift register 26 at serial input H.

The sample pulses are counted by a counter 27 (4520A) and output Q4 of counter 27 (4520A) is synchronised with the eighth sample pulse. Output Q4 of counter 27 generates the gate pulse and coincides with the end of transmission of an eight-bit word. Counter 27 (4520A) is reset by G2 and G3 when Q4 (4520A) together with output Q4 of counter 25 (4022R) are high (timing is shown in FIG. 4).

After receiving eight bits, the word is placed in shift register 26 (74C164) and is checked for parity by exclusive OR gates G4 to G8 inclusive. The code given by the outputs Q2, Q3, Q4 of the shift register 26 (74C164) is compared with the unit number held by unit 26A by exclusive OR gates G9, G10 and G11. An output is obtained at gates G13 and I8 when the word in the shift register holds the correct unit number, when the parity is correct and when the gate pulse is present. The data present at output Q8 of shift register 26 (74C164) is placed in the addressable latch 21 (4723/A) pin D at the address determined by outputs Q6 and Q7 of shift register 26 (74C164). Circuit 28 (4052B) is used as a de-multiplexer and the pulse present on the signal bus during the eighth time bit slot may be of analogue height and this is presented to the addressed output of circuit 28 (4052/B).

The gate pulses are counted by counter 29 (4520/B) and a pulse at output Q3 of counter 29 is produced after the fourth gate pulse by gating this with output Q5 of counter 25 (4022R). Hence a switch pulse is produced at point OC after all four eight bit words have been received. The timing is shown in FIG. 4. The switch pulse transfers the digital data from addressable latch 21 (4723/A) to output latch 20 (74C175) which initiates the switching of appropriate loads, if the signals at the output of latch 20 (74C175) are high. In this way the switching of all loads is deferred until the end of transmission, and transients arising from switching cannot interfere with data transmission. The bistable circuit 23 (4013/BR) is present merely to detect the presence of a parity error and when such error occurs an LED 30 is lit.

Thus the sequence of events in the operation of each transmitter is as follows.

1. If the output Q14 of counter 13 (4020) is high, counter 12 (4040) interrogates the signal bus 54A and if this is low for 0.5 ms continuously, a sync. pulse SCP is generated clearing counters and transmission begins (FIG. 3a).

2. 32 μs clock pulses followed by 20 μs bits are transmitted alternately until all four by eight bit words appropriate to the transmitters's inputs have been sent, taking a time of 2 ms (FIG. 3a).

3. After 2 ms, output Q10 of counter 13 (4020) rises and transmission ends.

4. Counter 13 (4020) continues counting and transmission is disabled until output Q14 of counter 13 (4020) rises after a time of 32 ms.

5. The signal bus 54A is again interrogated and the sequence repeats.

The sequence of events in the operation of each receiver is as follows:

1. If a pulse longer than 28 μs is present on the signal bus 54A (i.e. a clock pulse) then a negative pulse A is produced at the clock input to counter 24 (4013/AR) (FIG. 4a).

2. Pulse A changes state of counter 24 (4013/AR) and enables counter 25 (4022/R) to count. The decoded outputs of counter 25 (4022/R) are gated to produce and 8 μs sample pulse falling within the bit transmission time (FIGS. 4 and 4a).

3. Sample pulses clock the inverse of bits present on the signal bus 54A into shift register 26 (74C164).

4. A gate pulse is produced by counter 27 (4520A) to coincide with the eighth sample pulse (FIG. 4b).

5. The gate pulse enables the parity of the received word to be checked and the unit or box number compared with the internal code.

6. If check in 5 is correct the data on the signal bus 54A is routed to the appropriate analogue output address.

7. The digital data in output Q8 of shift register 26 (74C164) is placed in appropriate address of addressable latch 21 (4723/A).

8. Gate pulses are counted by counter 29 (4520/B) and a switch pulse is generated after the sampling of 32nd bit (FIG. 4c).

9. The data is transferred to the output latch 20 (74C175) and load switching initiated as appropriate.

One course of events to initiate a specific action will now be described by way of example. The action required is the switching on of the vehicle's windscreen wipers. Say the wipers are connected to digital output address No. 3 in unit or box 5, and say that the wiper control switch is the No. 2 input in unit or box No. 3.

The code for the No. 2 input in box 3 is:

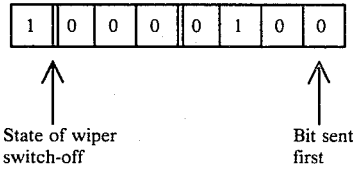

State of wiper switch-off

Bit sent first

All boxes receive the inverse of this data word namely:

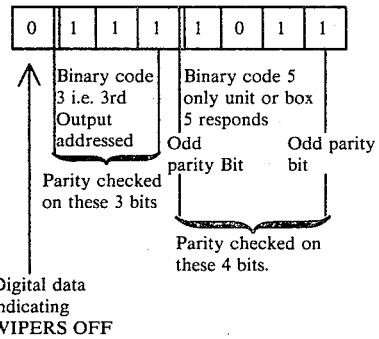

Digital data indicating WIPERS OFF

On receiving this word only box 5 responds and if parity is correct a zero data bit is placed on the output No. 3 of box 5 after the transmission of all 32 bits from box 3.

When the wiper switch is thrown "on" then the last bit to be sent (bit 8) changes to zero. Therefore, a data bit 1 appears at the next transmission of box 3 in the shift register of box 5. A "1" is placed at the address 3 of box 5 at the switch pulse and the wiper motor starts moving. This 1 is received 30 times each second and the motor continues to run until a zero resulting from opening the wiper switch is sent. Zero's are then sent 30 times each second and the motor stays off.

It can be seen that to receive a single piece of false data will be of no consequence as it will be corrected at the next transmission 32 ms later. 32 ms is too fast for any action to result from the false signal. Even if this action were not too fast and a false result were likely to be produced, a time delay could be introduced in the specific piece of equipment to prevent this.

A variable resistor could be used to control the speed of the wiper motor rather than a switch, using the same input No. 2 box 3. The same code would apply except that the motor drive circuitry would be connected to analogue output No. 3 box 5 rather than the digital output.

A pulse of height determined by the input control resistor would appear at the output No. 3 Box 5, 30 times every second. The drive circuitry would sample and hold these pulses and use the magnitude of the voltage to directly regulate the speed of the wiper motor.

All the circuits of the above described embodiment are CMOS and are either 4000 series or 7400 series. The 7400 series are pin compatible with 7400 TTL but are at present only manufactured by National semiconductors with typical identification MM 74COO11. The 4000 series are manufactured by several manufacturers. The National semiconductor code is CD4000 BCN where as RCA's code is CD4000 AE and Motorola's code is MC 1 4000 BCP. The numbers types and descriptions of the various CMOS circuits employed are as follows;

| No. | Type | Description. |
|---|---|---|
| 2 | 4520 | 2 by 4 bit counter |
| 1 | 4047 | multivibrator |
| 1 | 74C164 | 8 bit shift register |
| 2 | 4013 | Dual D-flip Flop |
| 2 | 4022 | 8 stage decoded counter |
| 1 | 4723 | 4 bit addressable latch |
| 2 | 4052 | Dual Analogue 4/1 Multiplexer/Demultiplexer |
| 1 | 74C175 | Quad D type Flip Flop |
| 3 | 74C32 | Quad 2-in OR gate |
| 1 | 74C08 | Quad 2-in AND gate |
| 1 | 74C14 | Hex Schmitt Inverter |
| 2 | 74C86 | Quad Exclusive OR gate |
| 1 | 74C30 | 8-in AND gate |
| 1 | 4040 | 12 stage counter |
| 1 | 4016 or 4066 | Quad Analogue Switch |
| 1 | 4020 | 14 stage counter |
| 4 | 4051 | 8/1 Analogue Multiplexer/Demultiplexer |
| 1 | 4073 | Triple 3-in AND gate |
| 1 | 74Co4 | Hex inverter |

Loads such as horns, bulbs, wipers etc. on a vehicle will develop faults. It is possible to develop circuits in conjunction with power switching circuitry to monitor the state of the load and generate a logic one if the load goes open circuit. Alternatively a separate logic one could be generated if the load becomes a short circuit in which case the switching of power to the load is inhibited, hence removing the requirement to fuse the system.

The pulse indicating that a particular load contains a fault if fed to one of the inputs of the box feeding the load, and this pulse is transmitted in the normal way with an associated code. A special box, say box No. 8 (FIG. 7) is set aside to deal with the reception of all such fault data from loads round the vehicle. This special box does not transmit nor does it have inputs from switches or outputs to loads. Its function is to receive, decode and display the fault signals generated in and transmitted by all other boxes.

The words are received in the way described previously and are placed in a shift register 62 74C164 as before by the generation of sample pulses applied to the clock input 61 to read data in at the serial input 60. There is no requirement for parity bits and the code for box 8 would be 1000 placed in Q4 to +1 inclusively in shift register 62. This is identified in the way previously described by comparing this code with wired code 63 via exclusive OR gates 64, 74C86. The output of the AND gate 66 rises on receipt of a gate pulse generated in the way previously described when present together with correct box identification. This latches the four bits Q8 to Q5 inclusive into 65, 74C175. The bits Q7, Q6, Q5 hold the code number of the fault transmitted whilst Q8 holds the data bit indicating that a fault exists if high or does not exist if low. The bits Q7, Q6, Q5 are decoded by 67 and signals applied to drive a seven segment display 68. This display is lit when transistor 69 is on and sinks the current from the common cathode. The transistor 69 is on only when a data bit Q1 in latch 65 is high.

The following example illustrates the action of this system. A head lamb bulb, coded 5, goes open circuit. The bulb is fed from box 2 which contains circuitry to sense the state of the bulb. When the open circuit state is detected a zero state is transmitted from one of the inputs in box 2. The transmitted code would be

| 0 | 010 | 0111 | but the inverse would appear in shift register 62 namely

| Q8 | | Q1 |
| 1 | 101 | 1000 |

Fault code is displayed | Code 5 | Box No. 8

The result is that the seven segment display is lit and a 5 is displayed. The number 5 is interpreted and the exact fault, namely a failed head lamp, is identified. When no faults exist Q8 always contains a zero and the display is not lit. Information as to the state of those loads containing appropriate circuitry are transmitted every 32 ms. Erroneous transmissions are of no consequence as it would take about 10 successively incorrect signals to produce a flicker on the seven segment display. Information to indicate that each load being sensed is free of fault is also being sent 30 times every second.

It will be appreciated that the above embodiment has been described by way of example only and that many variants are possible without departing from the scope of the appended claims. In the broader sense the invention has general applicability in information transmission systems. As an alternative to the control of vehicle electrical apparatus the system could equally well be applied to security systems for premises where, for example, monitoring by remotely controllable visual and audio inspection devices is carried out and signals received in dependence upon the conditions monitored.

In the specific sense, the system described could be expanded to cater for more complex words and for a greater number of vehicle functions. Although CMOS counter devices have been used, other types of devices could be used as alternatives. For example monostable circuits instead of counters could be employed although it is thought that this would not provide as feasible a practical arrangement as the counter dependent embodiment.

What is claimed is:

1. A multiplex information handling system for handling data bits, comprising:
   control equipment having a state;
   a plurality of transmitters, each having at least one input connected to said control equipment, each of said plurality of transmitters including generating means for generating address codes for each of said data bits, said address codes being determined by the state of, and corresponding to, said control equipment;
   a plurality of receivers, each having at least one output which is connected to a corresponding load, and a respective receiver code identifying said at least one output;
   signal bus means for connecting said plurality of transmitters to said plurality of receivers so as to convey said address codes and said data bits from said plurality of transmitters to said plurality of receivers as transmitted address codes and transmitted data bits, respectively; and
   a power bus through which power is fed in operation to said plurality of transmitters and said plurality of receivers;
   each of said plurality of receivers including comparing means for comparing each conveyed address code with said receiver code, and routing means responsive to coincidence between said each conveyed address code and said respective receiver code for routing the conveyed data bits to said identified at least one output;
   each of said plurality of transmitters repeating its transmission after lapse of a predetermined time interval;
   whereby any one of said corresponding loads is controlled by said control equipment at any one of said transmitter inputs, given the address code corresponding to said control equipment coinciding with said respective receiver code identifying said at least one output connected to said corresponding load.

2. A multiplex information handling system, comprising:
   control equipment having a state;
   a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising a power bus through which power may be fed in operation to the transmitters and receivers, the signal bus and the power bus comprising a single coaxial cable, the signal bus comprising a central inner cable of said single coaxial cable and the power bus comprising a cable screen of said single coaxial cable.

3. A system as claimed in claim 1, wherein each receiver includes an independent clock which is resettable via signals on the signal bus derived from any transmitter, each of said plurality of transmitters including its own independent clock.

4. A system as claimed in claim 1, wherein each transmitter comprises means operative to detect when the signal bus has carried no signal for a predetermined time and, thereafter, to actuate said each transmitter to transmit said data bits to said signal bus means.

5. A system as claimed in claim 1, wherein each receiver comprises a plurality of inputs adapted, in operation, to receive information in one of digital form and analogue form.

6. A system as claimed in claim 1, wherein each transmitter comprises a plurality of inputs adapted, in operation, to transmit information in one of digital form and analogue form.

7. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising a power bus, and wherein the states of said control equipment are controlled so that said control equipment operates outside the transmission times of the transmitters, whereby to avoid interference and corruption of said signals carried by the signal bus by transients created on the power bus by equipment switching.

8. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said control equipment having a time constant, and said transmitted data bits having a repeat cycle time chosen to be faster than the time constant of any of the control equipment, so that the transmission of an error in one cycle of transmitted data bits is corrected in the next subsequent cycle without any error signal being registered on the control equipment.

9. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising means for electronically introducing a time constant for said control equipment so as to inhibit the registering of a faulty signal in one transmission cycle by said control equipment until that faulty signal can be corrected in the next subsequent transmission cycle.

10. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising biasing means for biasing said control equipment to turn on more quickly than it turns off.

11. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising biasing means for biasing said control equipment to turn off more quickly than it turns on.

12. A system as claimed in claim 1, wherein pulse height is employed in each transmission to convey information in analogue form.

13. A system as claimed in claim 1, further comprising applying means for applying a signal to the signal bus means to inhibit one of transmission and reception.

14. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising applying means for applying a signal to the signal bus means to inhibit one of transmission and reception;

wherein the applying means applies a d.c. signal.

15. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising applying means for applying a signal to the signal bus means to inhibit one of transmission and reception;

said system further comprising security device means operatively associated with said applying means for selectively enabling and disabling the system.

16. A system as claimed in claim 15, wherein the security device means comprises a lock.

17. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

said system further comprising applying means for applying a signal to the signal bus means to inhibit one of transmission and reception;

wherein each transmitter is disabled, in operation, for a predetermined time after transmission.

18. A system as claimed in claim 1, wherein each transmitter transmits information in the form of a binary word comprising the address of a unit for which the signal is intended, followed by the address of an output in the unit, followed by the data bits intended for the output in the unit.

19. A system as claimed in claim 18, wherein, in operation, the binary word additionally comprises one of odd and even parity checks for the addresses, and each receiver comprises means for interpreting said one of odd and even parity checks.

20. A system as claimed in claim 18, wherein each receiver receives said data bits grouped into words, and each receiver comprises a shift register having a number of stages equivalent to the data bits of the words to be received, and output gate logic means for comparing the address bits of each said word received with a preprogrammed code.

21. A system as claimed in claim 1, wherein certain ones of said plurality of transmitters comprise means for transmitting a fault signal representative of a fault condition in any of said control equipment and means for receiving said fault signal and for identifying the source of the fault therefrom.

22. A multiplex information handling system, comprising:

control equipment having a state;

a plurality of transmitters, each having at least one input connected to said control equipment, each of said plurality of transmitters including generating means for generating address codes for each of said data bits, said address codes being determined by the state of, and corresponding to, said control equipment;

a plurality of receivers, each having at least one output which is connected to a corresponding load, and a respective receiver code identifying said at least one output; and signal bus means for connecting said plurality of transmitters to said plurality of receivers so as to convey said address codes and said data bits from said plurality of transmitters to said plurality of receivers as transmitted address codes and transmitted data bits, respectively;

each of said plurality of receivers including comparing means for comparing each conveyed address code with said receiver code, and routing means responsive to coincidence between said each conveyed address code and said respective receiver code for routing the conveyed data bits to said identified at least one output;

whereby any one of said corresponding loads is controlled by said control equipment at any one of said transmitter inputs, given the address code corresponding to said control equipment coinciding with said respective receiver code identifying said at least one output connected to said corresponding load;

wherein certain ones of said plurality of transmitters comprise means for transmitting a fault signal representative of a fault condition in any of said control equipment and means for receiving said fault signal and for identifying the source of the fault therefrom;

said system further comprising display means operatively associated with the means for receiving said fault signal for displaying the location of the fault to which the received fault signal relates.

23. A system as claimed in claim 1, wherein all transmitted signals include a coded identification.

24. A system as claimed in claim 23, wherein the coded identification is displayable on a seven segment numerical display.

25. A system as claimed in claim 23, wherein the coded identification is displayable on an alphabetic display.

26. A system as claimed in claim 23, wherein the coded identification is displayable on an alphanumeric display.

* * * * *